Patented Aug. 14, 1945

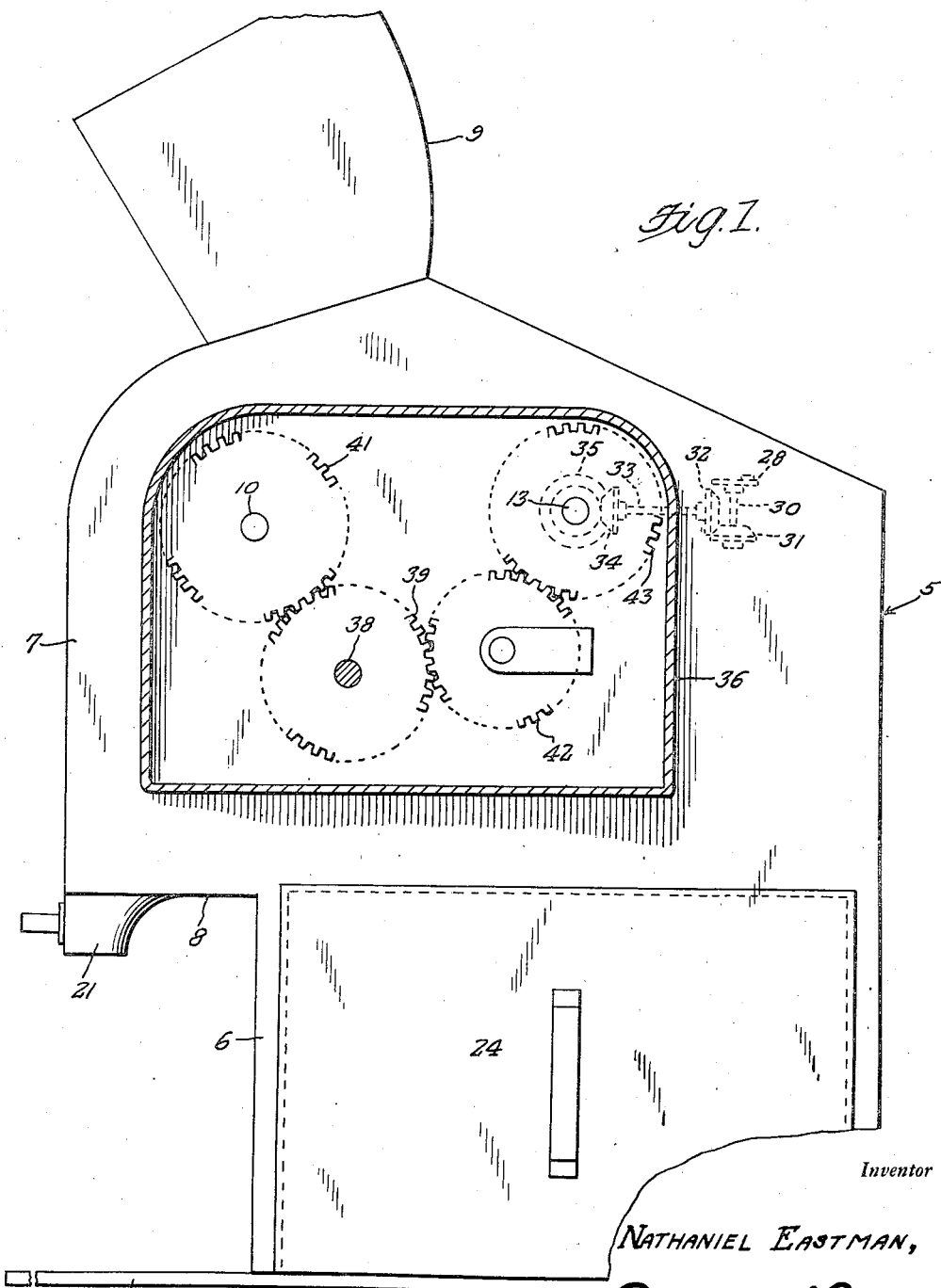

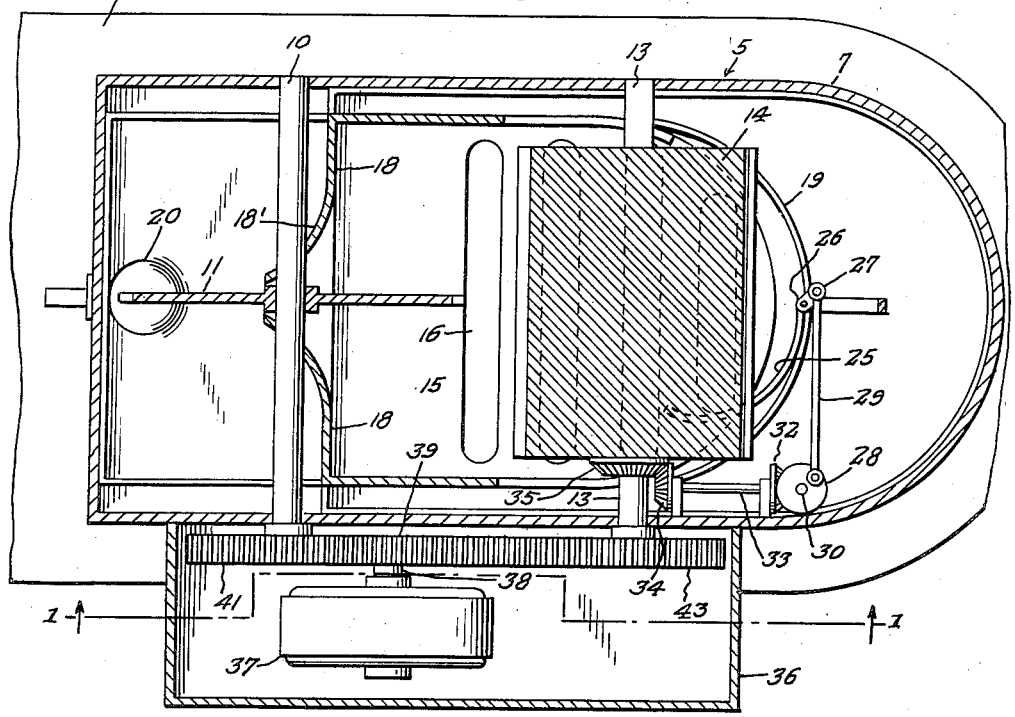
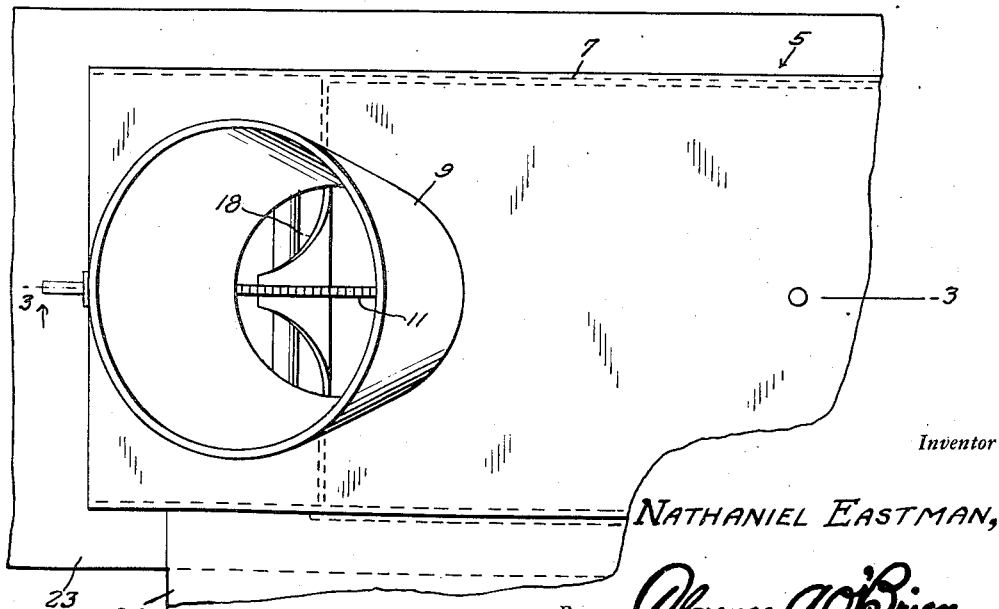

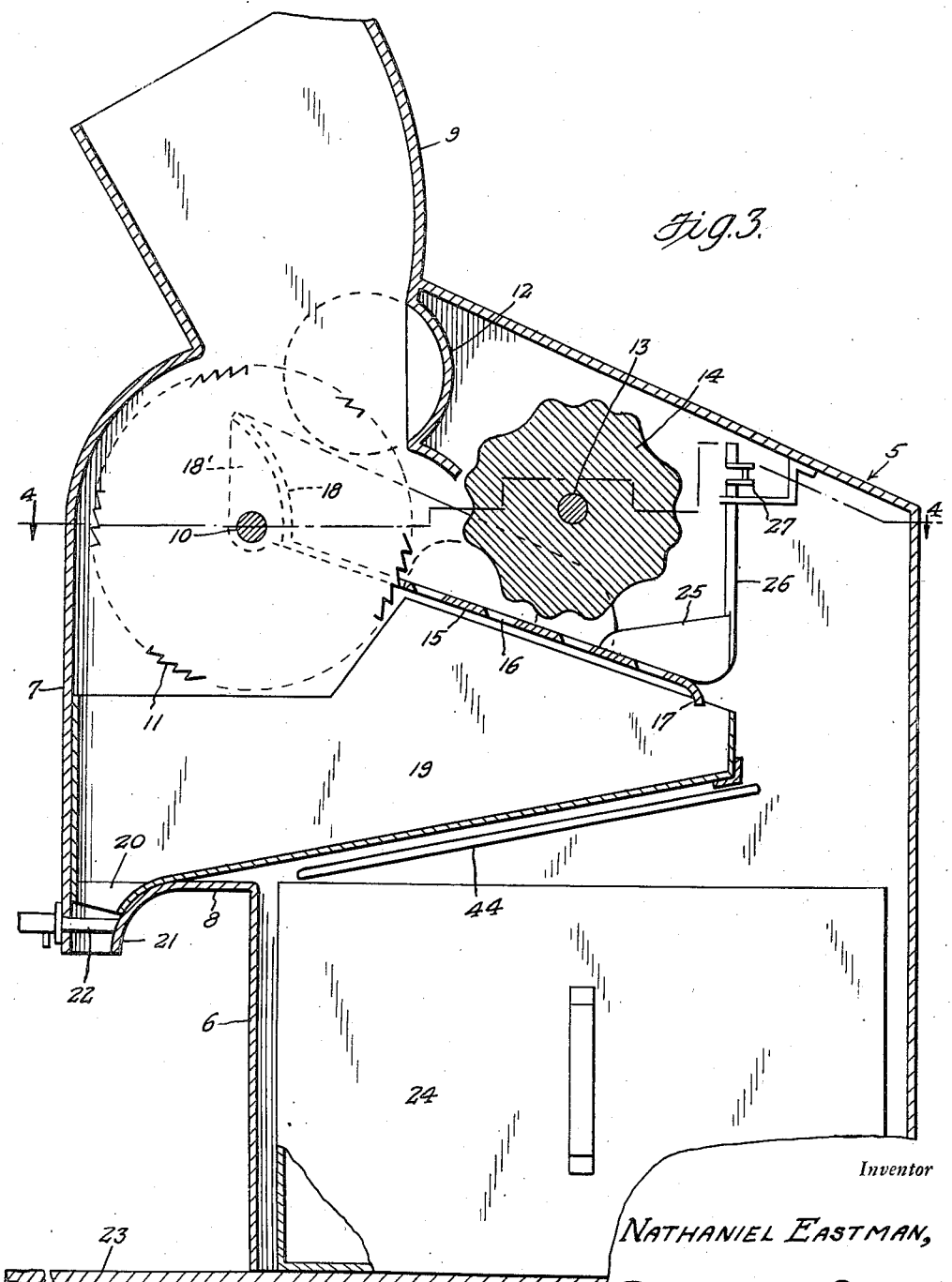

2,382,620

UNITED STATES PATENT OFFICE 2,382,620

FRUIT-CUTTING AND JUICE-EXTRACTING MACHINE

Nathaniel Eastman, New York, N. Y.

Application July 5, 1944, Serial No. 543,577

4 Claims. (Cl. 100—47)

This invention relates to improvements in fruit-cutting and juice-extracting machines, and the primary object of the present invention is to provide a machine of this kind into which the whole fruit may be fed for being cut into halves, and in which means is provided for squeezing the halves of the fruit to extract the juice therefrom.

More specifically, the present invention contemplates the provision of a machine of the above character embodying a receptacle to receive the extracted juice and from which the juice may be dispensed at will.

A still further object of the present invention is to provide a machine of the above kind including a receptacle to receive the fruit skins pursuant to the juice-extracting operation, and simple and efficient means for positively delivering the skins from the juice-extracting means to the skin receptacle.

Other objects and features of the present invention will become apparent from the following description when considered in connection with the accompanying drawings, and the invention consists in the novel form, combination and arrangement of parts hereinafter more fully described, shown in the drawings and claimed.

In the accompanying drawings, wherein like reference characters indicate corresponding parts throughout the several views:

Figure 1 is a view partly in side elevation and partly broken away in section, of a machine constructed in accordance with the present invention, the plane of section being indicated by the line 1—1 of Figure 4.

Figure 2 is a fragmentary top plan view thereof.

Figure 3 is a vertical longitudinal sectional view of the machine taken on the plane of line 3—3 of Figure 2 and partly broken away.

Figure 4 is a horizontal section taken on line 4—4 of Figure 3.

Referring in detail to the drawings, the present machine includes a casing 5 having a lower portion 6 and an upper portion 7 whose forward part projects forwardly beyond the lower portion 6, as at 8. The casing 5 is provided at the top and near the front with a central feed hopper 9 of frusto conical form, and journaled transversely of the upper portion of the casing directly beneath the hopper 9 is a shaft 10 on which is fixed a rotary cutting disc 11 located midway between the sides of the casing, as shown clearly in Figure 4. Depending from the top of the casing 5 at the rear of the hopper 9 and above the rear of the cutting disc 11 is a concavo spherical slicing plate 12. Another transverse shaft 13 is journaled in the upper portion of the casing rearwardly of the plate 12 and has a squeezing roll 14 secured thereon. Disposed beneath the roll 14 and extending at a rearward inclination from a point adjacent shaft 10 to a point rearwardly of roll 14 is a drain plate 15 whose rear portion is slotted or apertured, as at 16, and whose rear end is downturned, as at 17. The forward end portion of drain plate 15 is provided with a central longitudinal slot to accommodate the cutter 11, and extending upwardly and forwardly from the forward end of drain plate 15 is a deflector having portions 18 at opposite sides of the cutting disc 11 whose inner ends curve inwardly and forwardly and are rearwardly inclined, as indicated at 18' in Figure 4. Disposed in the upper portion of the casing beneath the drain plate 15 is a receptacle or pan 19 arranged to receive the juice as it drains through the openings 16 of plate 15 or as it runs off of the rear lower end of the latter. The juice-receiving pan 19 has a forwardly inclined bottom and is provided at the front with a central outlet spout 20 which fits into the upper portion of a discharge spout 21 provided on the bottom of the forwardly projecting part of the upper casing portion 7. Discharge spout 21 has a suitable manually operable cut-off valve 22, and it will be noted that the casing has a base provided with a forwardly projecting portion 23 on which may be placed a drinking glass or other receptacle to receive the fruit juice from the discharge spout 21 when the valve 22 is opened.

As shown clearly in Figures 3 and 4, the juice-receiving pan 19 terminates in spaced relation to the rear wall of casing 5 slightly beyond the rear end of drain plate 15, and the lower portion of the casing has a side opening through which is inserted a removable drawer 24 that extends rearwardly beyond the receptacle 19.

The drawer 24 is arranged to receive the fruit skins pursuant to the juice-extracting operation, and these skins are delivered from the drain pan 15 rearwardly of roll 14 into the drawer 24 by ejecting means including a horizontal oscillating ejector arm 25 fixed on the lower end of a vertical rock shaft 26 and movable across the upper surface of the drain plate 15. The shaft 26 is provided with a crank 27 operatively connected with a crank disc 28 by means of a connecting rod 29, and crank disc 28 is fixed on the upper end of a vertical shaft 30 journaled at one side of the casing. Shaft 30 also carries a bevel gear 31 meshing with a bevel gear 32 fixed on the rear end of a horizontal shaft 33. Another bevel gear 34 is provided on the forward end of shaft 33 and meshes with a bevel gear 35 fixed on the shaft 13 of roll 14. A motor and gear housing 36 is provided on the adjacent side of the casing above the drawer 24, and mounted in this casing is an electric motor 37 whose drive shaft 38 carries a spur gear 39 meshing with a gear 41 fixed on the adjacent end of shaft 10 which carries cutting disc 11. Gear 39 also meshes with an idler gear 42 which in turn meshes with a gear 43 fixed on the adjacent end of shaft 13 for roll 14. It will thus be seen that when the motor 37 is thrown into operation, the cutting disc 11 is rotated in a clockwise direction, as viewed in Figure 3, and the roll 14 is rotated in a counterclockwise direction, as seen in the same view. At the same time, the shaft 26 is oscillated so as to swing the ejector arm 25 back and forth across the upper surface of the drain plate 15 at the rear end of the latter. Obviously, a suitable switch may be mounted on the casing for throwing the motor 37 into or out of operation.

As seen in Figure 3, the roll 14 is disposed directly above the drain plate 15 and in close proximity to the latter. Also, its periphery is provided with alternate fluted and concave portions, for a purpose to be presently described.

In operation, the whole fruit is fed into the casing by gravity from the hopper 9 so as to rest upon the cutting disc 11. As the cutting disc 11 is rapidly rotated, it forces the fruit against the slicing plate 12 and gradually cuts through the fruit until the latter is cut in half. The halves of the fruit are directed downwardly and rearwardly onto the drain plate 15 by the deflector plate portions 18, and due to the curvature and inclination of the inner ends of the plate portions 18, as at 18', the halves of the fruit are turned slightly so as to be directed flat side down onto the drain plate 15. As the roll 14 rotates, the fluted portions thereof engage the fruit halves and draw them rearwardly under the roll 14 between the latter and the drain plate 15, causing the fruit halves to be squeezed for expressing the juice therefrom. This juice passes through the drain plate or from the latter into the pan 19, as mentioned above, and the fruit skins are delivered rearwardly from the roll 14 into the path of the ejector arm 25. The ejector arm then discharges the fruit skins rearwardly from the drain plate 15 into the drawer 24, and the drawer 24 may be removed from time to time when it is desired to empty the same. If desired, the juice collected in the pan 19 may be cooled by suitable means so that the same will be cool and ready to drink when dispensed through the discharge spout 21. A cooling coil for this purpose is indicated under the pan 19, at 44 in Figure 3.

In view of the foregoing, it will be seen that the present machine is specially adapted to extract the juice from citrus fruits and to deliver the juice in a clean and sanitary manner without wasting the juice. It is believed that the construction and operation, as well as the advantages of the present invention, will be readily understood and appreciated by those skilled in the art. Minor changes may be made in the details of construction illustrated and described, such as fairly fall within the spirit and scope of the invention as claimed.

What I claim is:

1. A fruit-cutting and juice-extracting and dispensing machine, comprising a casing provided with a forward feed hopper at the top thereof, a slicing plate disposed in the upper portion of the casing at the rear of said hopper, a vertical rotary cutting disc journaled in the casing beneath the hopper and forwardly of the slicing plate and arranged to cooperate with the latter for cutting a fruit into halves, a transverse pressing roll journaled in the casing rearwardly of said slicing plate, a rearwardly inclined drain plate extending beneath the roll and having a slotted forward end receiving the rear portion of said cutting disc, deflector plates disposed at opposite sides of said cutting disc and curved and inclined to deliver the halves of fruit rearwardly onto the drain plate with the flat faces thereof down, said roll being located in proximity to the drain plate for squeezing the fruit halves to express the juice therefrom, a juice-receiving pan mounted in the casing beneath the cutting disc, the drain plate and the roll, said pan having a forwardly inclined bottom and provided at its forward end with an outlet spout, said casing having a discharge spout receiving the outlet spout of the pan and provided with a manually operable cut-off valve, and a skin receptacle mounted in the lower portion of the casing beneath and extending rearwardly of said pan.

2. A fruit-cutting and juice-extracting and dispensing machine, comprising a casing provided with a forward feed hopper at the top thereof, a slicing plate disposed in the upper portion of the casing at the rear of said hopper, a vertical rotary cutting disc journaled in the casing beneath the hopper and forwardly of the slicing plate and arranged to cooperate with the latter for cutting a fruit into halves, a transverse pressing roll journaled in the casing rearwardly of said slicing plate, a rearwardly inclined drain plate extending beneath the roll and having a slotted forward end receiving the rear portion of said cutting disc, deflector plates disposed at opposite sides of said cutting disc and curved and inclined to deliver the halves of fruit rearwardly onto the drain plate with the flat faces thereof down, said roll being located in proximity to the drain plate for squeezing the fruit halves to express the juice therefrom, a juice-receiving pan mounted in the casing beneath the cutting disc, the drain plate and the roll, said pan having a forwardly inclined bottom and provided at its forward end with an outlet spout, said casing having a discharge spout receiving the outlet spout of the pan and provided with a manually operable cut-off valve, a skin receptacle mounted in the lower portion of the casing beneath and extending rearwardly of said pan, and ejecting means for discharging the skin from the drain plate into said receptacle when delivered rearwardly from the roll.

3. A fruit-cutting and juice-extracting and dispensing machine, comprising a casing provided with a forward feed hopper at the top thereof, a slicing plate disposed in the upper portion of the casing at the rear of said hopper, a vertical rotary cutting disc journaled in the casing beneath the hopper and forwardly of the slicing plate and arranged to cooperate with the latter for cutting a fruit into halves, a transverse pressing roll journaled in the casing rearwardly of said slicing plate, a rearwardly inclined drain plate extending beneath the roll and having a slotted forward end receiving the rear portion of said cutting disc, deflector plates disposed at opposite sides of said cutting disc and curved and inclined to deliver the halves of fruit rearwardly onto the drain plate with the flat faces thereof down, said roll being located in proximity to the drain plate for squeezing the fruit halves to express the juice therefrom, a juice-receiving pan mounted in the casing beneath the cutting disc, the drain plate and the roll, said pan having a forwardly inclined bottom and provided at its forward end with an outlet spout, said casing having a discharge spout receiving the outlet spout of the pan and provided with a manually operable cut-off valve, a skin receptacle mounted in the lower portion of the casing beneath and extending rearwardy of said pan, ejecting means for discharging the skin from the drain plate into said receptacle when delivered rearwardly from the roll, said ejecting means including an oscillating ejector arm movable across the rear portion of the drain plate, and motor-operated means for oscillating said ejector arm and for rotating the cutter and said roll.

4. A fruit cutting and juice extracting machine, comprising a casing provided with a feed hopper at the top thereof, a slicing plate disposed in the upper portion of the casing, a vertical rotary cutting disc journalled in the casing beneath the hopper and arranged to cooperate with the slicing plate for cutting a fruit into halves, a transverse pressing roll journaled in the casing, an inclined drain plate extending beneath the roll, deflector plates disposed at opposite sides of said cutting disc and curved and inclined to deliver the halves of fruit rearwardly onto the drain plate with the flat faces thereof down, said roll being located in proximity to the drain plate for squeezing the fruit halves to express the juice therefrom, and a juice receiving pan mounted in the casing beneath the cutting disc, the drain plate and the roll.

NATHANIEL EASTMAN.